United States Patent [19]

Novack et al.

[11] Patent Number: 5,381,504
[45] Date of Patent: Jan. 10, 1995

[54] OPTICAL FIBER ELEMENT HAVING A PERMANENT PROTECTIVE COATING WITH A SHORE D HARDNESS VALUE OF 65 OR MORE

[75] Inventors: James C. Novack, St. Paul, Minn.; Bryon J. Cronk, Hudson, Wis.; James W. Laumer, White Bear Lake; Tracy R. Woodward, Cottage Grove, both of Minn.; David A. Krohn, Hamden, Conn.

[73] Assignee: Minnesota Mining and Manufacturing Company, St. Paul, Minn.

[21] Appl. No.: 152,206

[22] Filed: Nov. 15, 1993

[51] Int. Cl.6 .................................................. G02B 6/16
[52] U.S. Cl. ...................................... 385/128; 65/385; 385/141; 427/163.1
[58] Field of Search ................ 385/123, 124, 126-128, 385/141, 144, 145; 427/162, 163; 65/3.11, 3.4, 3.41, 3.43, 3.44, 385, 435

[56] References Cited

U.S. PATENT DOCUMENTS

| | | | |
|---|---|---|---|
| 4,072,400 | 2/1978 | Claypoole et al. | 385/128 |
| 4,217,027 | 8/1980 | MacChesney et al. | 385/123 |
| 4,682,850 | 7/1987 | White et al. | 385/128 X |
| 4,822,687 | 4/1989 | Kessel et al. | 428/447 |
| 4,973,129 | 11/1990 | Fukuzawa et al. | 385/126 |
| 4,987,158 | 1/1991 | Eckberg | 522/31 |
| 4,990,546 | 2/1991 | Eckberg | 522/170 |
| 5,054,883 | 10/1091 | Eckberg | 385/145 |
| 5,139,816 | 8/1992 | Eckberg | 427/54.1 |
| 5,158,991 | 10/1992 | Riding | 522/170 |
| 5,181,269 | 1/1993 | Petisce | 385/128 |

FOREIGN PATENT DOCUMENTS

| | | |
|---|---|---|
| 1256821 | 7/1989 | Canada . |
| 0410622 | 1/1991 | European Pat. Off. . |
| 02-153308 | 6/1990 | Japan . |
| 04-66905 | 3/1992 | Japan . |
| 2256604 | 12/1992 | United Kingdom . |
| WO91/03503 | 3/1991 | WIPO . |

OTHER PUBLICATIONS

"Fiber Construction for Improved Mechanical Reliability", by Roberts et al., SPIE, vol. 1366, Fiber Optics Reliability (1990), pp. 129–135.
"Constributions and Effects of Coatings on Optical Fibers", by Lawson, Optical Fiber Coatings Group, DeSoto, Inc., 10 pages, No Date.
"Newly Developed, Small Diameter Optical Link Cord Using Compound Glass Fiber", by Machida et al., International Wire & Cable Symposium Proceedings 1992, pp. 401–405.
Durometer-Plastometer Conversion Chart, Shore Instruments Mfg., dated Jul. 27, 1994, p. 1.

Primary Examiner—John D. Lee
Attorney, Agent, or Firm—Gary L. Griswold; Walter N. Kirn; Thomas C. Lagaly

[57] ABSTRACT

An optical fiber element includes an optical fiber having a numerical aperture ranging from 0.08 to 0.34 and a protective coating affixed to the outer surface of the optical fiber. The protective coating has a Shore D hardnees value of 65 or more and remains on the optical fiber during connectorization so that the fiber is neither damaged by the blades of a stripping tool nor subjected to chemical or physical attack.

38 Claims, 2 Drawing Sheets

OPTICAL FIBER ELEMENT HAVING A PERMANENT PROTECTIVE COATING WITH A SHORE D HARDNESS VALUE OF 65 OR MORE

FIELD OF THE INVENTION

The present invention relates to an optical fiber element and, more particularly, to an optical fiber element comprising an optical fiber having a protective coating affixed to the outer surface thereof to protect the optical fiber during connectorization.

BACKGROUND OF THE ART

In the construction of glass-based optical fiber elements, a coating is usually applied to the glass optical fiber immediately after drawing to protect the glass surface from the detrimental effects of chemical and/or mechanical attack which would otherwise occur. Such forms of attack, to which glass optical fibers are particularly susceptible, greatly decrease the mechanical strength of optical fibers and lead to their premature failure.

Conventionally, several coatings are applied to optical fibers, with each serving a specific purpose. A soft coating is applied initially to protect the fiber from microbending losses, and a harder, secondary coating is applied over the soft coating to provide resistance to abrasion.

The connectorization process (i.e., coupling an optical fiber element to another optical fiber element or other optical element via a splicing device or optical connector) conventionally entails the removal of all coating layers such that the bare glass surface is exposed. The glass surface is usually cleaned by wiping it with a soft tissue which has been moistened with an alcohol such as isopropanol. The fiber is then fixed into a connector ferrule or splicing device using an adhesive such as an epoxy, hot melt, or acrylic adhesive. Upon curing (or cooling) of the adhesive, the fiber end face is polished and the connectorization process is complete.

During the connectorization process, the optical fiber is very vulnerable. Initially, the fiber may be nicked by the blades of the tool used to remove the outer coatings during the stripping operation. After stripping, the bare fiber is exposed to elements in the local environment. These are likely to include water vapor and dust particles. Water acts chemically on the surface of the glass and dust acts as an abrasive. Both of these effects contribute to failure of the glass fiber. Most failures in optical fiber systems tend to occur at the sites of connector installation.

One solution to the problem of fiber stripping and exposure during connectorization has been proposed in U.S. Pat. No. 4,973,129. That patent discloses an optical fiber element wherein a resin composition having a Shore D hardness value of 65 or more (specified in the Japanese Industrial Standards at room temperature) is applied to the surface of a glass optical fiber having a numerical aperture (NA) value of 0.35 or more. The resin is then cured to form a primary coating layer which does not have to be peeled from the optical fiber at the time of connectorization. Instead, the primary layer remains on the fiber during connectorization (and thereafter) to prevent the fiber from being damaged as described above. Useable optical fibers are said to be limited to those having a NA value of 0.35 or more because the optical losses caused by microbending ("microbending loss") increase upon covering the optical fiber with such a hard resin. In optical fibers with a NA value below 0.35, microbending loss was found to be so great as to make optical communications impractical. When the NA of the optical fiber is 0.35 or more, however, microbending loss was not found to be a problem.

Unfortunately, optical fiber elements which require an optical fiber having a NA value of 0.35 or more are not commercially useful. As is known, NA is a measure of the angle of light which will be accepted and transmitted in an optical fiber. Optical fiber elements having a NA value of 0.35 or more find limited use in communication, data transmission, and other high bandwidth applications for two reasons: 1) limited information-carrying capacity and 2) incompatibility with existing, standardized communication fibers (which normally have NA values less than 0.29). The information-carrying capacity of an optical fiber is usually expressed as bandwidth. Bandwidth is a measure of the maximum rate at which information can pass through an optical fiber (usually expressed in MHz-km). Bandwidth is inversely proportional to NA because the higher order modes (analogous to higher angles of incident light) have longer paths in the fiber, thereby resulting in pulse broadening or dispersion. The bandwidth limitation of an optical fiber element occurs when individual pulses travelling through that fiber can no longer be distinguished from one another due to dispersion. Thus, the larger the NA value of an optical fiber, the smaller is that fiber's bandwidth (and therefore information-carrying capacity). Most commercially useful optical fibers have a NA value of 0.29 or less. As compared to the information-carrying capacity of such commercially useful optical fibers, fibers having a NA value of 0.35 or more carry far less information in a given period of time and are therefore undesirable.

Incompatibility becomes a problem when one optical fiber element is spliced or connected to another optical fiber element. In this instance, it is important to minimize signal attenuation at the point of connection. When an optical fiber element with a higher NA value is spliced to a fiber with a lower NA value, all light exceeding the NA value of the receiving fiber will be attenuated. Light-carrying capacity is proportional to the square of the NA. Thus, as an example, 38% of the light will be lost when transmitted from a fiber with a NA value of 0.35 to a fiber with a NA value of 0.275. This is a significant and unacceptable loss in signal.

Accordingly, a need exists in the art for an optical fiber element which protects the optical fiber during connectorization and which allows the use of optical fibers having NA values smaller than 0.35.

SUMMARY OF THE INVENTION

The present invention provides an optical fiber element comprising an optical fiber having a numerical aperture ranging from 0.08 to 0.34 and a protective coating affixed to the outer surface of the optical fiber. The protective coating has a Shore D hardness value of 65 or more and remains on the optical fiber (i.e., is not stripped from the fiber) during connectorization so that the fiber is neither damaged by the blades of a stripping tool nor subjected to chemical or physical attack by, e.g., water vapor or dust.

It is preferred that the optical fiber element further include a buffer which substantially encloses the optical fiber and the protective coating. The buffer may include an inner, resilient layer and an outer, rigid layer. The inner, resilient layer is preferably of sufficiently low modulus (e.g., 0.5 to 20 MPa) to provide the optical fiber element with protection against microbending losses. The outer, rigid layer is preferably of sufficiently high modulus (e.g., 500 to 2500 MPa) to protect the underlying layers from abrasion and mechanical damage.

The protective coating preferably forms an adhesive bond with both the optical fiber and with the inner, resilient layer of the buffer. In this manner, the protective coating and buffer form an integral coating. During connectorization, however, enough of the buffer must be removed to allow the optical fiber and protective coating to be inserted in and adhered to a connector or splicing device. To facilitate this, the bond formed between the protective coating and the optical fiber is greater than that formed between the protective coating and the inner, resilient layer, thereby allowing the buffer to be easily stripped from the fiber and protective coating.

The present invention also provides a method for producing an optical fiber element. The method comprises the steps of:

providing an optical fiber having a numerical aperture ranging from 0.08 to 0.34; and affixing a protective coating to the outer surface of the optical fiber, the protective coating preferably having a Shore D hardness value of 65 or more.

The method may further include the step of applying a buffer which substantially encloses the optical fiber and the protective coating, the buffer including an inner, resilient layer and an outer, rigid layer.

DETAILED DESCRIPTION OF THE INVENTION

Figure 1:
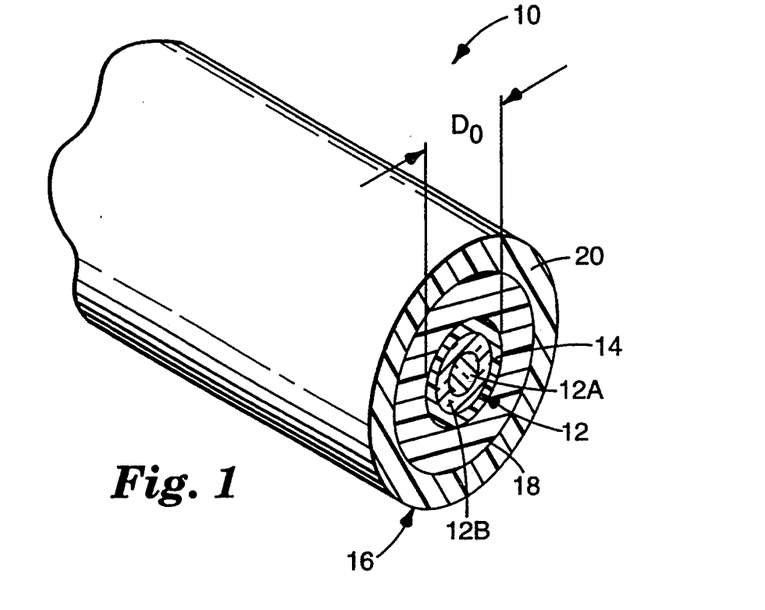
FIG. 1 illustrates an optical fiber element constructed in accordance with the present invention, including an optical fiber, a protective coating, and a buffer.

FIG. 1 shows an optical fiber element 10 constructed in accordance with the present invention. Optical fiber element 10 includes an optical fiber 12, a protective coating 14, and a buffer 16. Optical fiber 12 further includes a core 12A and cladding 12B. Core 12A and cladding 12B are preferably constructed of glass, but may also be constructed of any suitable material. For example, core 12A can also be made from poly(methyl methacrylate), polystyrene, polycarbonate, alloys of the foregoing, fluorinated or deuterated analogs to the foregoing, fluoropolymers and alloys thereof, and silicones. Cladding 12B can also be constructed from materials other than glass, such as fluoropolymers, fluoroelastomers, and silicones. Buffer 16 longitudinally encloses optical fiber 12 and protective coating 14, and preferably includes an inner, resilient layer 18 and an outer, rigid layer 20. Inner, resilient layer 18 provides optical fiber element 10 with protection against microbending losses while outer, rigid layer 20 protects the underlying layers from abrasion and mechanical damage.

Optical fiber 12 may have any desired numerical aperture (NA) range, but preferably has a NA value ranging from 0.08 to 0.34. Further, optical fiber 12 may be either a single mode fiber (i.e., supports only one path that a light ray can follow in travelling down the optical fiber element) or a multi-mode fiber (i.e., capable of supporting multiple paths for light rays to follow in travelling down the optical fiber element). When optical fiber 12 is a single mode fiber, the NA thereof preferably ranges from about 0.11 to about 0.20. When optical fiber 12 is a multi-mode fiber, the NA thereof preferably ranges from about 0.26 to about 0.29.

Protective coating 14 is affixed to the outer surface of optical fiber 12 (or, more precisely, to the outer surface of cladding 12B). During the process of connectorization, buffer 16 is stripped from a predetermined length of a terminal end of optical fiber element 10 to allow the fiber to be properly inserted into and bonded with an optical fiber connector or splicing device. Protective coating 14, however, remains on the outer surface of optical fiber 12 (i.e., is not stripped from the fiber) during the process of connectorization and permanently thereafter. In this manner, protective coating 14 prevents optical fiber 12 from being damaged by the blades of a stripping tool (used to remove buffer 16) or weakened by chemical or physical attack from, e.g., water vapor or dust, which would otherwise occur if the bare glass surface of optical fiber 12 were exposed. Protective coating 14 should have a sufficiently high degree of hardness that the coating is resistant to mechanical force and abrasion. Specifically, protective coating 14 should allow optical fiber element 10 to be handled, stripped, cleaned, and clamped inside of a connector or splicing device without incurring damage to the surface of optical fiber 12. Further, once clamped and bonded inside of a connector or splicing device, protective coating 14 should be hard enough that optical fiber 12 does not exhibit signal loss due to radial movement of the coated fiber inside of the connector or splicing device. Protective coating 14 is sufficiently hard for these purposes when it has a Shore D hardness value of 65 or more (as determined in accordance with ASTM D2240).

In addition to a Shore D hardness value of 65 or more, the ideal protective coating would also provide the following:

1) a barrier to water vapor, dust, and other agents of chemical and mechanical attack against the glass optical fiber;
2) surface characteristics such that the protective coating adheres strongly to the glass outer surface of the optical fiber so that it is not easily removed, and at the same time adheres weakly to the buffer so that the buffer can be easily stripped from the coated optical fiber without causing damage to the fiber; and
3) the ability to form strong bonds with the adhesives used to affix optical fibers to connectors and splicing devices.

Any coating having a Shore D hardness value of 65 or more and which provides, at least to some degree, all or most of the above-listed properties may be utilized as protective coating 14. While the present optical fiber element is not limited to any particular group of protective coating materials, a number of suitable materials have been identified. For example, the protective coating may comprise an epoxy-functional polysiloxane having the structure:

wherein:
the ratio of a to b ranges from about 1:2 to about 2:1; and
R is an alkyl group of one to three carbon atoms.

Such epoxy-functional polysiloxanes are described in U.S. Pat. No. 4,822,687, the disclosure of which is incorporated herein by reference, and in copending U.S. patent application Ser. No. 07/861,647, filed Apr. 1, 1992.

Preferably, the protective coating further includes a bisphenol A diglycidyl ether resin having the structure:

wherein the average value of n ranges from 0 to 2. More preferably, the average value of n is less than 1.

Suitable bisphenol A diglycidyl ether resins are commercially available from The Dow Chemical Company as D.E.R. TM 331 and D.E.R. TM 332, and also from Shell Oil Company as Epon TM 828. The bisphenol A diglycidyl ether resin may be present in the protective coating at a weight percentage ranging from about 0 to 20, and the epoxy-functional polysiloxane may be present at a weight percentage ranging from about 80 to 100. The weight percentage of bisphenol A diglycidyl ether resin in the protective coating may be extended to about 30 by decreasing the upper limit of the ratio range of a to b in the epoxy-functional polysiloxane to about 1.5:1 (so that the range is from 1:2 to 1.5:1). It should be noted that the protective coating may contain other constituents (e.g., catalysts, sensitizers, stabilizers, etc.). Thus, the above weight percentages are based only upon the total amount of epoxy-functional polysiloxane and bisphenol A diglycidyl ether resin present in the protective coating.

As an additional example of a protective coating material, the bisphenol A diglycidyl ether resin set forth above may alone be used as the protective coating (i.e., without any epoxy-functional polysiloxane).

A further example of a suitable protective coating material includes the above-described epoxy-functional polysiloxane along with a cycloaliphatic epoxide having the structure:

Suitable cycloaliphatic epoxides are commercially available from Union Carbide under the tradname ERL-4221. In this instance, the ratio of a to b in the epoxy-functional polysiloxane preferably ranges from about 1:2 to about 1.5:1, and the cycloaliphatic epoxide is present in the protective coating at a weight percentage ranging from about 0 to 50 (with the balance comprising epoxy-functional polysiloxane). As before, the weight percentages are based on the total amount of epoxy-functional polysiloxane and cycloaliphatic epoxide in the protective coating.

Another example of an appropriate protective coating includes the aforementioned epoxy-functional polysiloxane and cycloaliphatic epoxide along with an alpha-olefin epoxide having the structure:

$$R-\underset{H}{\overset{}{C}}-\underset{H}{\overset{O}{C}}-H$$

wherein R is an alkyl of 10 to 16 carbon atoms. Such alpha-olefin epoxides are commercially available as Vikolox TM from Atochem North America, Inc., Buffalo, N. Y. Preferably, the alpha-olefin epoxide is present in the protective coating at a weight percentage of about 20, the cycloaliphatic epoxide is present at a weight percentage ranging from about 27 to 53, and the epoxy-functional polysiloxane makes up the balance. Further, the ratio of a to b in the epoxy-functional polysiloxane desirably ranges from about 1.5:1 to 2:1. Again, the weight percentages are based on the total amount of epoxy-functional polysiloxane, cycloaliphatic epoxide, and alpha-olefin epoxide in the protective coating.

A further example of a protective coating according to the present invention is a novolac epoxy having the structure:

wherein the average value of n ranges from 0.2 to 1.8. The preferred value is 0.2. Such novolac epoxies are commercially available from The Dow Chemical Company as D.E.N. TM 431, D.E.N. TM 438, and D.E.N. TM 439.

As noted above, buffer 16 preferably includes an inner, resilient layer 18 and an outer, rigid layer 20. It has been found that by including a relatively soft, resilient layer (18) to the outer, longitudinal surface of protective coating 14, microbending losses are minimized. Thus, even though protective coating 14 has a high degree of hardness (Shore D hardness of 65 or more), the relatively soft inner, resilient layer 18 allows optical fibers having virtually any NA value to be used in the present optical fiber element without incurring unacceptably high microbending losses. For this reason, commercially useful optical fibers having NA values ranging from 0.08 to 0.34 may be used.

In order to provide sufficient protection from microbending losses, inner, resilient layer 18 preferably has a modulus ranging from 0.5 to 20 MPa. It is also preferred that inner, resilient layer 18 be capable of bonding with protective coating 14. In this manner, protective coating 14 and buffer 16 together form an integral coating for optical fiber 12. However, the bond between protective coating 14 and inner, resilient layer 18 should be sufficiently weak that buffer 16 can be easily stripped from protective coating 14. Specifically, the bond between protective coating 14 and optical fiber 12 should be stronger than the bond between protective coating 14 and inner, resilient layer 18. In this manner, buffer 16 can be readily stripped from optical fiber element 10 without also removing protective coating 14 or causing damage to optical fiber 12.

Inner, resilient layer 18 may be constructed from any material having the foregoing physical properties. Examples of suitable materials include acrylate or epoxy functional urethanes, silicones, acrylates, and epoxies. Materials which are easily cured using ultraviolet radiation are preferred. Such materials are commercially available within the desired modulus range of 0.5 to 20 MPa. Acrylate functional silicones, such as those which are commercially available from Shin-Etsu Silicones of America, Inc., Torrance, Calif., are preferred. A particularly preferred acrylate functional silicone is Shin-Etsu OF-206, which was determined to have a modulus of 2.5 MPa at room temperature.

Outer, rigid layer 20 protects the underlying coatings from abrasion and compressive forces. To this end, it is preferred that outer, rigid layer 20 has a modulus ranging from 500 to 2500 MPa. Non-limiting examples of acceptable materials from which outer, rigid layer 20 may be constructed include acrylate or epoxy functional urethanes, silicones, acrylates, and epoxies. Acrylate functional urethanes are preferred. Such acrylated urethanes are commercially available from DSM Desotech, Inc., Elgin, Ill. A particularly preferred acrylated urethane, having a modulus of 1300 MPa (23° C.), is available from DeSotech, Inc. as DeSolite®950-103.

The diameters of optical fiber element 10 and optical fiber 12, as well as the thicknesses of protective coating 14 and buffer 16, will vary depending upon the particular application in which the optical fiber element is used. Generally, it is preferred that the combined diameter $D_o$ of optical fiber 12 and protective coating 14 be compatible with the connector, splicing device, or other optical element into which the coated optical fiber is to be inserted. Thus, the diameter $D_o$ should be no larger (nor much smaller) than that which can be accommodated by such elements. In this regard, it has been found that when the diameter $D_o$ ranges from about 120 to 130 micrometers, and is preferably about 125 micrometers, optical fiber element 10 will be compatible with most commercially available connectors, splicing devices, and other optical elements. At such a diameter, protective coating 14 may range in thickness from about 8 to about 23 micrometers, cladding 12B may range in thickness from about 8 to about 24 micrometers, and core 12A will generally be about 62.5 micrometers in diameter. It should be understood, however, that such thicknesses/diameters are merely representative of current industry standards, and may be changed without deviating from the scope of the present invention.

In further accordance with current industry standards, the total diameter of optical fiber element 10 preferably ranges from about 240 to about 260 micrometers. As such, the thickness of inner, resilient layer 18 preferably ranges from about 15 to about 38 micrometers, and the thickness of outer, rigid layer 20 preferably ranges from about 25 to about 48 micrometers. Again, such dimensions are merely representative of current industry standards. The scope of the present invention is not limited to any particular set of thicknesses or diameters.

Optical fiber element 10 may be produced by any conventional optical fiber production technique. Such techniques generally involve a draw tower in which a preformed glass rod is heated to produce a thin fiber of glass. The fiber is pulled vertically through the draw tower. Along the way, the fiber passes through one or more coating stations in which various coatings are applied and cured in-line to the newly drawn fiber. The coating stations each contain a die having an exit orifice which is sized to apply the desired thickness of the particular coating to the fiber. Concentricity monitors and laser measuring devices are provided near each coating station to ensure that the coating applied at that station is coated concentrically and to the desired diameter.

To facilitate the coating process, the compositions giving rise to protective coating 14 and buffer 16 preferably have a viscosity ranging from 800 to 15,000 cps, and more preferably from 900 to 10,000 cps. Conveniently, inner, resilient layer 18 and outer, rigid layer 20 can be wet coated in the same coating station and then cured simultaneously.

In order that the invention may be more readily understood, reference is made to the following examples, which are intended to be illustrative of the invention, but are not intended to be limiting in scope.

FIBER DRAWING PROCESS

Preform Preparation

A fiber optic preform was first prepared in accordance with U.S. Pat. No. 4,217,027.

Fiber Drawing

The fiber optic draw tower used in the draw process was based on an enclosed Nokia system which featured a Nokia-Maillefer fiber draw tower (Vantaa, Finland). To begin the draw process, a downfeed system was used to control the rate at which the optical preform was fed into a 15 KW Lapel zirconia induction furnace (Lapel Corp., Maspeth, NY) in which the preform was heated to a temperature at which it may be drawn to fiber (between about 2200° to 2250° C.). Below the heat source, a LaserMike ™ laser telemetric measurement system was used to measure the drawn fiber diameter as well as monitor the fiber position within the tower.

The newly formed fiber was then passed to a primary coating station at which the protective coating was applied. The coating station included a coating die assembly, a Fusion Systems® Corp. microwave UV curing system, a concentricity monitor, and another laser telemetric system. The coating die assembly, based on a Norrsken Corp. design, consisted of a sizing die(s), back pressure die and a containment housing which was mounted on a stage having adjustment for pitch and tilt and x-y translation. These adjustments were used to control coating concentricity. The protective coating material was supplied to the coating die assembly from a pressurized vessel and was applied, cured and measured within the primary coating station.

The coated fiber then proceeded on to a secondary coating station where a buffer was applied to the coated fiber. In certain cases it was desirable to apply two buffer layers simultaneously in a wet-on-wet application at the secondary coating station. In this case an additional sizing die was used and an additional vessel was used to supply material to this die. The coatings were applied, one after the other, and then cured and the outer diameter measured. As required, additional coatings could be applied via additional coating stations. Ultimately, the completed optical fiber element was drawn through a control capstan and onto a take-up spool (Nokia).

TESTING

Coating Dimension

Coating dimensions and concentricities are measured using an Olympus STM-MJS Measuring Microscope and MeasureGraph 123 software (Rose Technologies). The technique fits a circle to a number of points selected about the circumference. The size of these circles and their offset from center (from various components of the fiber structure) were determined and reported by the software.

Connector temperature Cycle

This test was modeled after Bellcore test TR-NWT-0003236 (Jun. 1992), "Generic Requirements for Optical Fiber Connectors". The Bellcore test cycles from −45° to 70° C. for 14 days. The test procedure used herein spanned −45° to 60° C. for 48 hours. The values reported are the maximum within this time.

Dynamic Fatigue Testing

This test was performed similarly to Fiber Optic Test Procedure ("FOTP") 28. The exceptions are as follows:
Strain Rate =9% minute
Gauge Length =4 meters
Environment =Ambient Laboratory

Microbending Testing

Microbending testing was done in accord with FOTP-68. The highest value obtained was reported.

Macrobending Testing

Macrobending testing consisted of determining the transmission of a fiber that was turned 180° about mandrels of various diameter. The transmission was determined as the ratio of the power out of the wrapped fiber/power out of unwrapped fiber. Care was taken to insure that other loops in the fiber were large enough (radius>10 cm) such that they did not contribute to the loss.

Numerical Aperture Testing

The numerical attenuation was determined using a Photon Kinetics Model FOA-2000 which refers to FOTP-177 for "Numerical Aperture Measurement of Graded-Index Optical Fibers". The test procedure was modified to accommodate experimental fiber by using shorter lengths of fiber (0.2–0.5 Km) rather than the ≧1 Km lengths specified in the FOTP.

Pull-Out Test

A tensile pull-out test was utilized to determine how well the connector adhesive adheres to the protective coating (which remains on the fiber during connectorization and permanently thereafter). An "ST" connector design was chosen due to its availability and compatibility with the test equipment. It consists of a zirconia ferrule mounted in a barrel to which was attached a bayonet assembly.

Fiber Preparation

In all of the following examples, 12 inch pieces of the completed optical fiber element were stripped to reveal 1.5–2.0 cm of the protective coating which was then cleaned with a tissue moistened with isopropyl alcohol. The fiber ends were allowed to dry prior to installing connectors.

Two-Pail Epoxy

A standard two-part epoxy for fiber optic connectors (either Tra-Con #BA-F112 or 3M #8690, Part No. 80-6107-4207-6) was used. It was mixed according to the manufacturer's instructions and poured from the mixing envelope into a syringe body. A plunger was installed taking care to avoid incorporation of air into the liquid. The syringe was fitted with a blunt-end needle. This assembly was used to inject adhesive into the ferrule from the barrel end until adhesive appeared at the tip end. The fiber was inserted such that the buffer coating bottomed in the barrel. The adhesive was cured for 25 minutes at 90° C.

Hot Melt Adhesive

A polyamide hot melt adhesive was provided preinstalled in ST connectors as a product (3M 6100 Hot-Melt™ Connector, Part No. 80-6106-2549-5). The connector was heated in the required oven (3M Part No. 78-8073-7401-8) for two minutes and removed. The optical fiber was immediately installed such that the buffer coating bottomed in the barrel. The connector was then left undisturbed until cool.

Pull-Out Testing

Pull-out testing was performed using an Instron tensile tester (Model 4201). Peak loads (before pull-out) were recorded. The average of five or ten tests was reported as the pull-out value for each sample.

Spectral Attenuation

The spectral attenuation of the fiber was determined using a Photon Kinetics Model FOA-2000. The operational reference was FOTP-46.

Catalyst Formulation

For each of the examples, the following catalyst formulation was used:
40 parts of bis(dodecylphenyl)iodonium hexafluoroantimonate 60 parts of a C10–C14 alcohol blend
4 parts 2-isopropylthioxanthone

EXAMPLES

Example 1

Epoxy-Functional Polysiloxane

Protective Coating Formulation

A protective coating formulation was prepared by thoroughly mixing 95 parts of an epoxy-functional polysiloxane with 5 parts of the above-described catalyst formulation. The epoxy-functional polysiloxane had the structure set forth above in which the ratio of a to b was 1:1 and R was a methyl group. This formulation was then filtered though a 0.2μpolysulfone filter disk into a amber glass bottle. 1 part of 3-glycidoxypropyltrimethoxysilane was added and thoroughly mixed.

Coating Process

The protective coating formulation was coated to a diameter of 125 μm on a 110 μm optical fiber which was freshly drawn from a Diasil TM preform at a draw speed of 30 MPM (meters per minute). The coating was cured and a subsequent layer of an acrylated urethane (Desotech 950–103) buffer was coated and cured to a diameter of 250 μm.

Dynamic Fatigue Analysis

Figure 2:
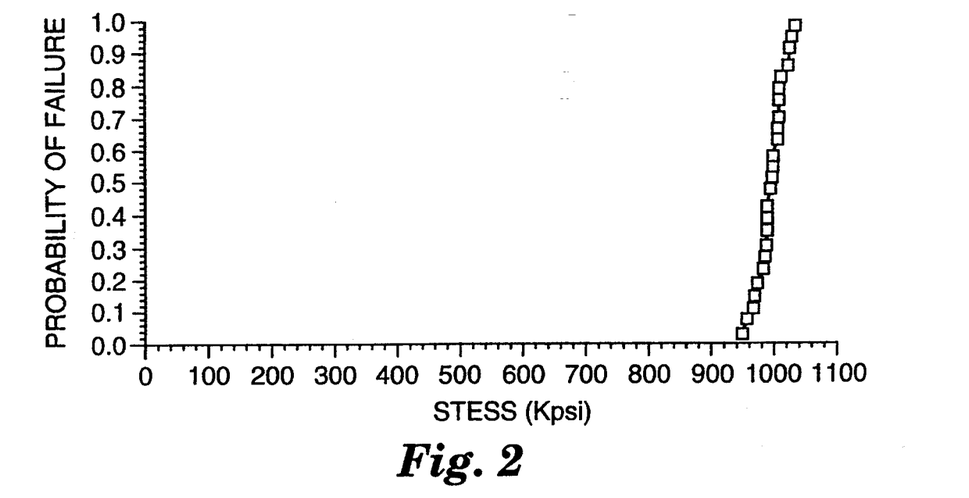
FIG. 2 graphically illustrates a dynamic fatigue analysis (Weibull plot) for the optical fiber element of Example 1.

The completed optical fiber element was subjected to tensile testing to failure (dynamic fatigue analysis). The Weibull statistics for such testing are shown in FIG. 2.

Pull-Out Test

The buffer coatings on this and similarly coated fiber elements were easily removed using conventional stripping tools. Connector pull-out testing gave the following results:

| Hot melt Adhesive | 5.2 lbs |
|---|---|
| Two-Part Epoxy | 6.1 lbs |

Example 2

Epoxy-Functional Polysiloxane/Bisphenol A: Dual Coat

Protective Coating Formulation

A mixture of 75 parts of the epoxy-functional polysiloxane used in example 1 was mixed with 25 parts Epon TM 828 bisphenol A diglycidyl ether resin (from the Shell Oil Co.). 5.3 parts of the catalyst formulation was added and thoroughly mixed and filtered though a 1.0 μm Teflon TM filter disc into an amber glass bottle.

Coating Process

This formulation was coated and cured to a 125 μm diameter on a 100 μm glass fiber which was freshly drawn from a graded index preform at a draw speed of 45 MPM. A buffer coating of acrylated urethane (DSM 950– 103 from DSM Desotech, Inc.), having a modulus of 1300 MPa was coated and cured to a 250 μm diameter.

Microbending Test

Figure 3:
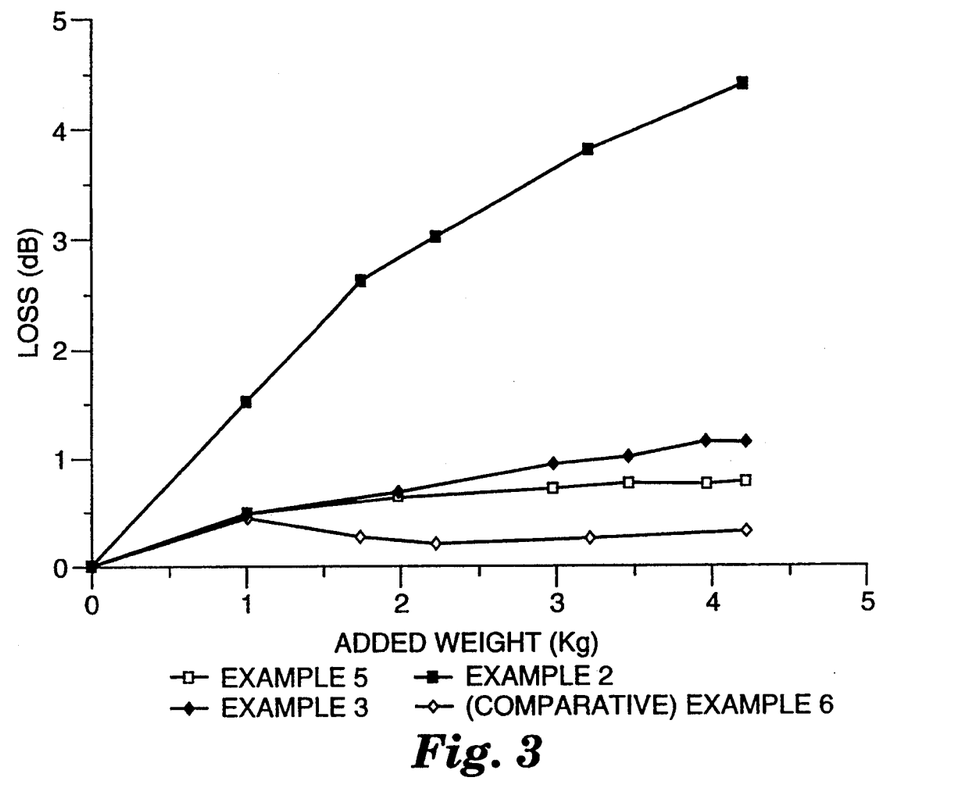
FIG. 3 graphically illustrates microbending test results for Examples 2, 3, 5, and 6.

The completed optical fiber element was tested for microbending according to FOTP-68 resulting in a maximum loss of 4.4 dB (see FIG. 3).

Pull-Out Test

A similarly coated optical fiber element gave the following results for connector pull-out tests:

| Hot melt Adhesive | 7.2 lbs |
|---|---|
| Two-Part Epoxy | 4.4 lbs |

Example 3

Epoxy-Functional Polysiloxane/Bisphenol A; Triple Coat

Protective Coating Formulation

The protective coating formulation was that described in Example 2.

Coating Process

The material was coated and cured to a 125 μm diameter on a 100 μm glass fiber which was freshly drawn from a graded index preform at a draw speed of 45 MPM. Inner and outer buffer layers (DSM 950–075 and DSM 950–103, respectively) were applied then cured simultaneously to diameters of 183 and 226 μm, respectively. The inner buffer layer had a modulus of 3.8 MPa while the outer buffer layer had a modulus of 1300 MPa.

Pull-Out Test

The optical fiber element gave the following results for connector pull-out tests:

| Hot melt Adhesive | 2.6 lbs |
|---|---|
| Two-Part Epoxy | 6.2 lbs |

Microbending Test

The optical fiber element was tested for microbending according to FOTP-68 resulting in a maximum loss of 1.15 dB (see FIG. 3).

Example 4

Novolac

Protective Coating Formulation

A protective coating formulation was prepared by thoroughly mixing 95 parts of an epoxy-novolac (Dow DEN 431) with 5 parts of catalyst formulation, This formulation was filtered to 0.5 μm through a Teflon TM filter disk into an amber bottle.

Coating Press

The protective coating formulation was coated and cured to a 125 μm diameter on a 100 μm glass fiber which was freshly drawn from an unpolished preform at a draw speed of 45 MPM, A buffer coating of acrylated urethane (DSM 9–17) was coated and cured to a 250 μm diameter.

Pull-Out Test

The optical fiber element gave the following results for connector pull-out tests:

| Hot melt Adhesive | 6.2 lbs |
|---|---|
| Two-Part Epoxy | 6.5 lbs |

Example 5

Epoxy-Functional Polysiloxane/Bisphenol A; Triple Coat

Protective Coating Formulation

A mixture of 75 parts of the epoxy-functional polysiloxane used in example 1 was mixed with 25 parts Epon TM 828 bisphenol A diglycidyl ether resin (from the Shell Oil Co.). 10 parts of the catalyst formulation was added and the formulation was thoroughly mixed and filtered though a 1.0 μm Teflon TM filter disc into an amber glass bottle.

Coating Process

The protective coating formulation was coated and cured to a 125 μm diameter on a 100 μm glass fiber which was freshly drawn from a graded index preform at a draw speed of 45 MPM. Inner and outer buffer layers (Shin-Etsu OF 206 and DSM 950-103, respectively) were applied and then cured simultaneously to diameters of 184 and 250 μm, respectively. The inner buffer layer had a modulus of 2.5 MPa while the outer buffer layer had a modulus of 1300 MPa.

Pull-Out Test

The optical fiber element gave the following results for connector pull-out tests:

| Hot melt Adhesive | 3.0 lbs |
| Two-Part Epoxy | 6.4 lbs |

Microbending Test

The optical fiber element was tested for microbending according to FOTP-68 resulting in a maximum loss of 0.76 dB (see FIG. 3).

Macrobending Test

Figure 4:
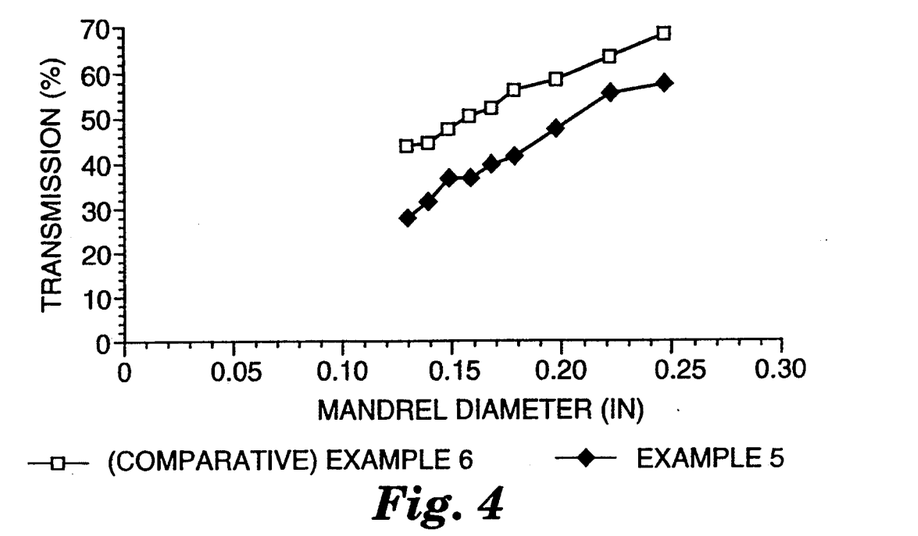
FIG. 4 graphically illustrates macrobending test results for Examples 5 and 6.

The fiber was tested for macrobending and the results are shown in FIG. 4.

Numerical Aperture

The numerical aperture was determined to be 0.258

Spectral Attenuation

The spectral attenuation, based on the modified FOTP-46, was determined to be as follows:
@850 nm=6.03 db/Km
@1300 nm=3.5 db/Km (Comparative) Example 6

Corning 62.5/125 μm

The fiber used for this comparative example was Corning TM Optical Fiber with the following identifications:

| Product: | LNF(TM) | 62.5/125 Fiber |
| Coat: | CPC3 | |
| Fiber ID: | 262712272304 | |

Pull-Out Test

The fiber gave the following results for connector pull-out tests:

| Hot melt Adhesive | 5.9 lbs |
| Two-Part Epoxy | 4.6 lbs |

Microbending Test

The fiber was tested for microbending according to FOTP-68 resulting in a maximum loss of 0.42 dB (see FIG. 3 ).

Macrobending Test

The fiber was tested for macrobending and the results are shown in FIG. 4.

Numerical Aperture A value for numerical aperture of 0.269 was provided by Corning (method unspecified).

Spectral Attenuation

The spectral attenuation values provided by Corning (method unspecified) were as follows:
@850 nm =2.7 db/Km
@1300 nm =0.6 db/Kin Example 7

Hardness Testing

Shore D hardness values of various protective coating formulations were evaluated using a Shore D durometer mounted on Shore Leverloader following the general procedure of ASTM D-2240. The samples were prepared by curing thin layers on top of each other such that large discs of the material resulted. Samples were at room temperature (23° C.) for testing.

| Formulation 1 | |
|---|---|
| 95% | Epoxy-functional polysiloxane in which the a:b ratio is 1:1 and R is a methyl group; and |
| 5% | Catalyst |
| Formulation 2 | |
| 71.2% | Epoxy-functional polysiloxane in which the a:b ratio is 1:1 and R is a methyl group; |
| 23.8% | Epon TM 828 bisphenol A piglycidyl ether resin; and |
| 5% | Catalyst |
| Formulation 3 | |
| 31.7% | Epoxy-functional polysiloxane in which the a:b ratio is 2:1 and R is a methyl group; |
| 63.3% | ERL-4221 cycloaliphatic epoxide; and |
| 5% | Catalyst |
| Formulation 4 | |
| 95% | Dow D.E.N. TM 431 novolac epoxy; and |
| 5% | Catalyst |

| RESULTS: Shore D Hardness | | | |
|---|---|---|---|
| Formulation | No. of Tests | Average Value | Deviation |
| 1 | * | * | * |
| 2 | 6 | 70 | 2 |
| 3 | 6 | 71 | 3 |
| 4 | 7 | 77 | 4 |

*due to brittleness of the sample it fractured upon penetration of the durometer point; therefore, accurate values were unattainable.

What is claimed is:

1. An optical fiber element, comprising:
   an optical fiber having a numerical aperture ranging from 0.08 to 0.34; and
   a protective coating affixed to the outer surface of said optical fiber, said protective coating having a Shore D hardness value of 65 or more.

2. The optical fiber element of claim 1 further including a buffer which substantially encloses said optical fiber and said protective coating, said buffer comprising an inner, resilient layer and an outer, rigid layer.

3. The optical fiber element of claim 2 wherein said inner, resilient layer has a modulus ranging from 0.5 to 20 MPa, and said outer, rigid layer has a modulus ranging from 500 to 2500 MPa.

4. The optical fiber element of claim 2 wherein said inner, resilient layer has a thickness ranging from 15 to 38 micrometers, and said outer, rigid layer has a thickness ranging from 25 to 48 micrometers.

5. The optical fiber element of claim 2 wherein said protective coating adhesively bonds with said optical fiber and with said inner, resilient layer, said bond with said optical fiber being stronger than said bond with said inner, resilient layer.

6. The optical fiber element of claim 1 wherein said protective coating comprises an epoxy-functional polysiloxane having the structure:

wherein:
 the ratio of a to b ranges from about 1:2 to about 2:1; and
 R is an alkyl group of one to three carbon atoms.

7. The optical fiber element of claim 6 wherein said protective coating further comprises a bisphenol A diglycidyl ether resin having the structure:

wherein n ranges from 0 to 2.

8. The optical fiber element of claim 7 wherein said bisphenol A diglycidyl ether resin is present in said protective coating at a weight percentage ranging from about 0 to about 20, said weight percentage based on the total amount of epoxy-functional polysiloxane and bisphenol A diglycidyl ether resin present in said protective coating.

9. The optical fiber element of claim 7 wherein the ratio of a to b ranges from about 1:2 to about 1.5:1, and wherein said bisphenol A diglycidyl ether resin is present in said protective coating at a weight percentage ranging from about 0 to about 30, said weight percentage based on the total amount of epoxy-functional polysiloxane and bisphenol A diglycidyl ether resin present in said protective coating.

10. The optical fiber element of claim 6 wherein said protective coating further comprises a cycloaliphatic epoxide having the structure:

11. The optical fiber element of claim 10 wherein the ratio of a to b ranges from about 1:2 to about 1.5:1, and wherein said cycloaliphatic epoxide is present in said protective coating at a weight percentage ranging from about 0 to about 50, said weight percentage based on the total amount of epoxy-functional polysiloxane and cycloaliphatic epoxide present in said protective coating.

12. The optical fiber element of claim 10 wherein said protective coating further includes an alpha-olefin epoxide having the structure:

wherein R is an alkyl of 10 to 16 carbon atoms.

13. The optical fiber element of claim 12 wherein:
 the ratio of a to b ranges from about 1.5:1 to about 2:1;
 said epoxy-functional polysiloxane is present in said protective coating at a weight percentage ranging from about 27 to about 53;
 said cycloaliphatic epoxide is present in said protective coating at a weight percentage ranging from about 27 to about 53; and
 said alpha-olefin epoxide is present in said protective coating at a weight percentage of about 20, said weight percentages based on the total amount of epoxy-functional polysiloxane, cycloaliphatic epoxide, and alpha-olefin epoxide present in said protective coating.

14. The optical fiber element of claim 1 wherein said protective coating comprises a novolac epoxy having the structure:

wherein the average value of n ranges from 0.2 to 1.8.

15. The optical fiber element of claim 1 wherein said protective coating comprises a bisphenol A diglycidyl ether resin having the structure:

wherein n ranges from 0 to 2.

16. The optical fiber element of claim 1 wherein said protective coating has a thickness ranging from 8 to 23 micrometers.

17. The optical fiber element of claim 2 wherein said optical fiber and said protective coating have a combined diameter ranging from about 120 to about 130 micrometers.

18. The optical fiber element of claim 17 wherein the total diameter of said optical fiber element ranges from about 240 to about 260 micrometers.

19. The optical fiber element of claim 1 wherein said optical fiber is capable of supporting multiple modes and has a numerical aperture ranging from about 0.26 to about 0.29.

20. The optical fiber element of claim 1 wherein said optical fiber is capable of supporting one mode and has a numerical aperture ranging from about 0.11 to about 0.20.

21. A method for producing an optical fiber element comprising the steps of:
providing an optical fiber having a numerical aperture ranging from 0.08 to 0.34; and
affixing a protective coating to the outer surface of said optical fiber, said protective coating having a Shore D hardness value of 65 or more.

22. The method of claim 21 further including the step of applying a buffer which substantially encloses said optical fiber and said protective coating, said buffer comprising an inner, resilient layer and an outer, rigid layer.

23. The method of claim 22 wherein said inner, resilient layer has a modulus ranging from 0.5 to 20 MPa, and said outer, rigid layer has a modulus ranging from 500 to 2500 MPa.

24. The method of claim 23 wherein said inner, resilient layer is applied at a thickness ranging from 15 to 38 micrometers, and said outer, rigid layer is applied at a thickness ranging from 25 to 48 micrometers.

25. The method of claim 22 wherein said protective coating adhesively bonds with said optical fiber and with said inner, resilient layer, said bond with said optical fiber being stronger than said bond with said inner, resilient layer.

26. The method of claim 22 wherein said optical fiber and said protective coating have a combined diameter ranging from about 120 to about 130 micrometers.

27. The method of claim 26 wherein the total diameter of said optical fiber element ranges from about 240 to about 260 micrometers.

28. The method of claim 21 wherein said protective coating is applied at a thickness ranging from 8 to 23 micrometers.

29. The method of claim 21 wherein said protective coating comprises an epoxy-functional polysiloxane having the structure:

wherein:

the ratio of a to b ranges from about 1:2 to about 2:1; and
R is an alkyl group of one to three carbon atoms.

30. The method of claim 29 wherein said protective coating further comprises a bisphenol A diglycidyl ether resin having the structure:

wherein n ranges from 0 to 2.

31. The method of claim 30 wherein said bisphenol A diglycidyl ether resin is present in said protective coating at a weight percentage ranging from about 0 to about 20, said weight percentage based on the total amount of epoxy-functional polysiloxane and bisphenol A diglycidyl ether resin present in said protective coating.

32. The method of claim 30 wherein the ratio of a to b ranges from about 1:2 to about 1.5:1, and wherein said bisphenol A diglycidyl ether resin is present in said protective coating at a weight percentage ranging from about 0 to about 30, said weight percentage based on the total amount of epoxy-functional polysiloxane and bisphenol A diglycidyl ether resin present in said protective coating.

33. The method of claim 29 wherein said protective coating further comprises a cycloaliphatic epoxide having the structure:

34. The method of claim 33 wherein the ratio of a to b ranges from about 1:2 to about 1.5:1, and wherein said cycloaliphatic epoxide is present in said protective coating at a weight percentage ranging from about 0 to about 50, said weight percentage based on the total amount of epoxy-functional polysiloxane and cycloaliphatic epoxide present in said protective coating.

35. The method of claim 33 wherein said protective coating further includes an alpha-olefin epoxide having the structure wherein R is an alkyl of 10 to 16 carbon atoms.

36. The method of claim 35 wherein:
the ratio of a to b ranges from about 1.5:1 to about 2:1;
said epoxy-functional polysiloxane is present in said protective coating at a weight percentage ranging from about 27 to about 53;
said cycloaliphatic epoxide is present in said protective coating at a weight percentage ranging from about 27 to about 53; and
said alpha-olefin epoxide is present in said protective coating at a weight percentage of about 20, said weight percentages based on the total amount of epoxy-functional polysiloxane, cycloaliphatic epoxide, and alpha-olefin epoxide in said protective coating.

37. The method of claim 21 wherein said protective coating comprises a novolac epoxy having the structure:

wherein n ranges from 0.2 to 1.8.

38. The method of claim 21 wherein said protective coating comprises a bisphenol A diglycidyl ether resin having the structure:

wherein n ranges from 0 to 2.

* * * * *